I. W. KNIGHT.
SAFETY DEVICE FOR GAS BURNERS.
APPLICATION FILED JAN. 27, 1919.
1,320,696. Patented Nov. 4, 1919.
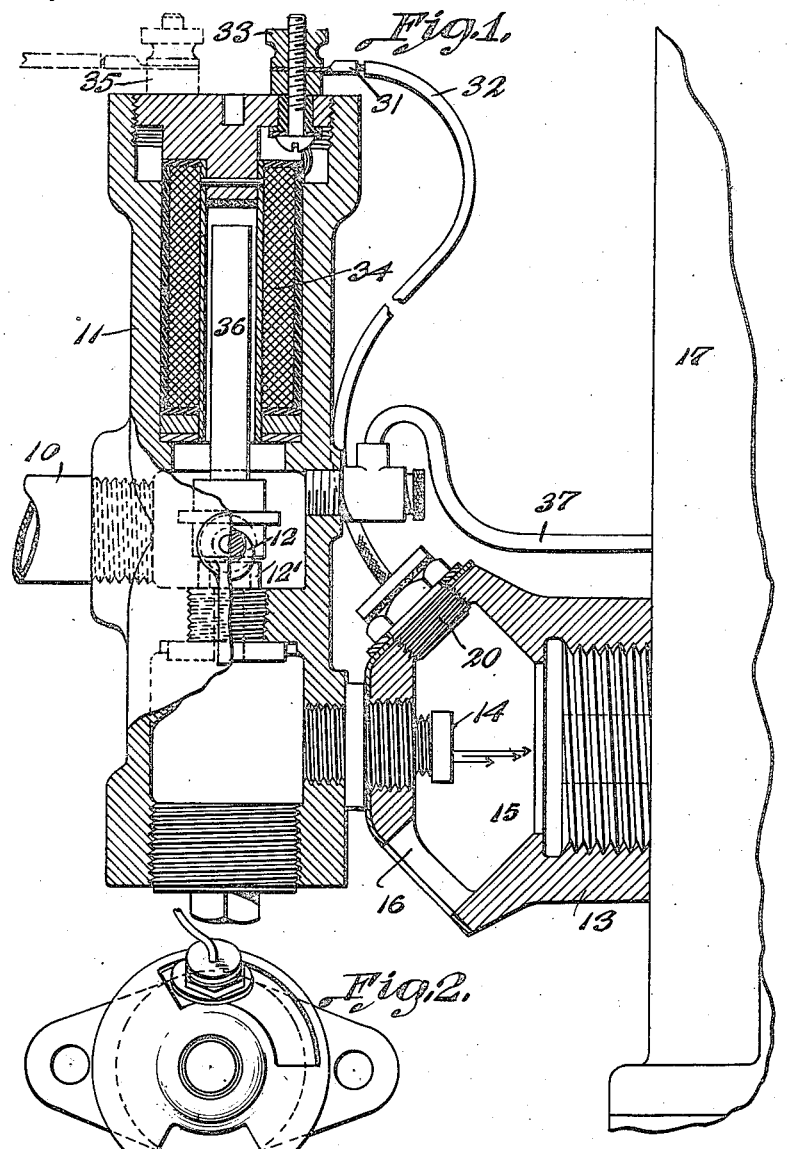
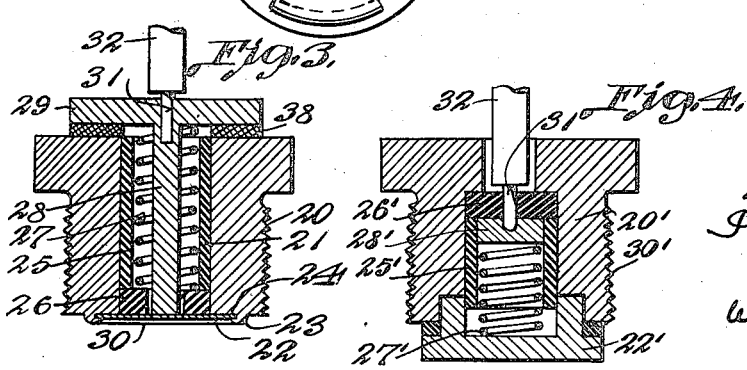
Inventor:
Ira W. Knight
by his attorneys
Mitchell, Chadwick & Kent

UNITED STATES PATENT OFFICE.

IRA W. KNIGHT, OF PROVIDENCE, RHODE ISLAND, ASSIGNOR TO GENERAL FIRE EXTINGUISHER COMPANY, OF PROVIDENCE, RHODE ISLAND, A CORPORATION OF NEW YORK.

SAFETY DEVICE FOR GAS-BURNERS.

1,320,696. Specification of Letters Patent. Patented Nov. 4, 1919.

Application filed January 27, 1919. Serial No. 273,301.

*To all whom it may concern:*

Be it known that I, IRA W. KNIGHT, a citizen of the United States, residing at Providence, in the county of Providence and State of Rhode Island, have invented certain new and useful Improvements in Safety Devices for Gas-Burners, of which the following is a specification.

This invention relates to improvements in safety devices for gas burners. More particularly it relates to gas burners used for heating or other purposes, and having a mixing chamber in which gas and a limited amount of air, known as primary air, are mixed, whence the mixture escapes through ports into the atmosphere and, with the addition of secondary air, burns with a blue flame. Burners of this type, which are common in various forms, and are applied to various uses, are generally subject to the danger that the flame may pass back through the burner ports into the mixing chamber. Various devices have been proposed to prevent such a flash-back; but none so far as I am aware has been devised prior to the present invention to protect the apparatus from danger in case a flash-back actually occurs. The marked utility of burners arranged for heating under thermostatic control has led to the designing of apparatus in various forms in which the gas is automatically turned on and ignited when the temperature in the medium that is to be controlled falls to a predetermined level. In such cases, as the apparatus works regardless of human attendance, the occurrence of a flash-back may not be known for a long time. It is a purpose of the present invention to prevent such danger by providing for automatic shut-off of the gas.

The invention is illustrated as it may be applied to a burner having an electrically-controlled gas valve, held open by the electric current. It operates by breaking the electric current whenever the interior of the burner becomes unduly heated, as happens in case of a flash-back with consequent combustion occurring within the mixing chamber. This breaking of the electric current is occasioned by the separation of two parts of the conductor carrying the electric current, consequent upon the fusing of a joint by which they are normally held together. Although illustrated in connection with an electrically-controlled valve, the source of power by which the circuit is broken is mechanical, being in the case illustrated the expansion of a spring, and so it may be understood that the invention is not limited to use with valves controlled by an electric current, but that the mechanical power released by the fusing which follows the occurrence of a flash-back can operate any other suitable sort of device for shutting off the gas. One feature of the invention consists in the arrangement of the fusible part in a removable plug in the burner, preferably in a conveniently accessible part of the mixing chamber. When a flash-back has occurred and the apparatus of the invention has operated, the gas will be left shut off and in safe condition; but operating conditions may be restored by an attendant simply substituting a new plug.

In the accompanying drawings:

Figure 1 is a side elevation in medial section showing an embodiment of the invention as it may be attached to and used in connection with an automatically controlled gas burner;

Fig. 2 is an end elevation of a part of the same;

Fig. 3 is a sectional view of the preferred form of plug; and

Fig. 4 is a similar view of a different form of plug.

Referring to the drawings, 10 indicates a gas supply pipe which leads into a casing 11 containing a valve 12 and connected with a burner 13 having a port 14 for entrance of the gas, which becomes mixed in the chamber 15 with primary air that enters the same through a shutter-regulable port 16. The burner 13 is represented as if arranged in connection with a radiator or other heating appliance 17, a fragment of which is shown. The appliance 17 may be understood to extend toward the right in Fig. 1 with the burner in it or under it and where are ports (not shown) for the escape of the mixture, outside of which ports is the normal position of the flame. When a flash-back occurs, combustion follows in the interior 15 of the burner 13, especially in the part shown in the drawing where the air entering through 16 first mingles with the gas coming through 14. The construction thus illustrated is no part of the invention but typifies various forms of construction to which the invention may be applied.

A principal feature of the invention is found in a screw or otherwise removable plug 20 whose general arrangement with respect to the burner and mixing chamber is illustrated in Fig. 1, and whose details of construction are seen in Fig. 3. As thus illustrated, the plug fills an opening in the mixing chamber's wall, made to receive it and so located that the inner end of the plug is exposed to the temperature conditions in the mixing chamber, preferably close to the place where the primary air and gas first come together. As illustrated, the plug consists of a tubular piece of metal 20 whose central passage 21 is closed by a disk 22 held rigidly and permanently in place by any suitable means, as by a turned-over lip or bead 23 which holds the disk down on a seat 24. Within the hollow 21 is insulating material 25, 26, of suitable size and shape to receive and to insulate from the metal 20, 22, a coiled spring 27 while permitting a central core 28 to pass through and make end contact with the disk 22. Preferably the insulation is in two pieces, one a sort of washer 26, resting against the disk 22 and having a central hole large enough for the post 28 to pass through loosely, and the other a cylindrical shell 25 extending from the washer through the plug to the outer face thereof and incasing the spring 27. The latter bears against the washer 26 and is normally under compression, pressing therefrom against the outside head 29 of post 28, so that the outward pressure of the spring tends constantly to push the post 28 out of the plug and away from the disk 22. The post 28 is, however, normally held in the position illustrated by its inner end, being soldered to the said disk 22, by a layer of solder indicated by the thick line 30, of such a composition as will melt at a predetermined temperature well above any temperature reached by it when the plug is set in place and the burner is operating normally, but below the temperature which the region of the plug attains when a flash-back has occurred and the flame is burning in the mixing chamber. The spring 27, being under compression, thrusts the post 28 out of the plug when the solder at 30 is thus melted. The parts illustrated in Fig. 3 constitute a portion of an electrical circuit comprising the flexible conductor 31 having ordinary insulation 32 and secured by any suitable means to the head 29; said central post 28; the fusible solder 30; the disk 22; and the metal 20 of the plug. The head 29 is insulated from the plug metal 20 except through the course mentioned. When installed for use, the circuit is "grounded" through this metal 20 and the metal 13 of the burner to the battery, generator, or other source of current (not shown). In the other direction, the circuit comes to the plug through the conductor 31, binding post 33, electro-magnet 34, binding post 35, and the conductor indicated in dotted lines, from the said battery, generator or other source. The magnet 34 has an armature 36 which controls the gas valve 12. The latter consists of a ball or other device adapted to fall upon its seat 12' by gravity, thus shutting off the gas, and to be lifted therefrom when a current passes through the magnet 34 to the armature 36 to which it is attached.

In a thermostatically controlled heater, the well known operation of the thermostat (not shown in the present drawings) is to make an electrical connection such that a current passes through the magnet, thus opening the valve 12 and letting gas into the burner 13, at whose discharge ports it is ignited by a pilot flame to which the pipe 37 seen in Fig. 1 leads. Upon the interruption of this circuit at the thermostat, the magnet releases the armature 36 and thus shuts off the gas. If, however, the thermostat has turned on the gas because the apartment which controls the thermostat is of too low a temperature, and if, upon the turning on of the gas a flash-back occurs, combustion will follow in the mixing chamber and may continue indefinitely without so raising the temperature of the apartment or apparatus which controls the thermostat as to cause a normal shut-off of the gas. The operation of the present invention is, however, very prompt to shut off the gas, because the parts of the plug 20 are included in the circuit which controls the magnet 34. Upon abnormal rise of temperature in the mixing chamber the melting of the solder 30 permits the spring 27 to throw the post 28 out of the plug, or at least to throw it far enough to separate it from the disk 22, thus breaking the circuit and terminating the lifting effect of the magnet 34 on the armature and valve, 36, 12. Ordinarily, the place for the plug 20 should be so positioned that the post will be thrown clear of the other apparatus when ejected; and the conductor 31 intervening between the plug and the binding post 33 should be long enough so that after being thrown clear the head 29 will hang below the bottom of the casing 11, in order to avoid a reëstablishment of electrical contact; or else the peripheral parts of the head 29 and any exposed parts of the post 28 should be made of or covered with insulating material.

In the form of plug illustrated in Fig. 3, the manufacture of the plug with precise accuracy is facilitated by providing a compressible insulating washer 38, of felt or the like, between the post's head 29 and the body 20 of the plug. This permits of suitable contact being made between the disk 22 and the post 28, through the intervening solder 30, by a quick process of manufacture without the necessity of a highly precise accuracy of thickness of solder plus length of post in order to make the head 29 tight against the plug 20.

Another form of plug is illustrated in Fig. 4 in which the tubular plug 20' carries on its inner face a cap 22' which is removable from that face of the plug except as it is held thereon by fusible solder at 30'. A spring 27', under compression, tends always to throw off this cap. The spring is insulated by a cylinder 25' and a washer 26' as before, but there is a metal block 28' within the insulation, connected with the conductor 31 and against which the spring 27' presses. The course of current in this form of the invention is through the conductor 31, the interior block 28', the spring 27', the cap 22', the fusible solder 30', and the plug 20', to the metal of the frame-work. In this case, when action occurs, the cap 22' is thrown into the burner chamber 15 and the spring 27' probably also will fall therein, leaving the circuit broken between the block 28' and the plug 20'.

In both of these cases, there is a sort of bridge, 22.or 22', between a central part of the circuit and the outer part of the plug; and in one case the bridge is removed, by the fusing (Fig. 4) while in the other the connection to the bridge is removed (Fig. 3).

Although the apparatus is illustrated as it may be arranged to break an electrical circuit, it is clear that the spring might be arranged to work any other kind of device for shutting off the gas, and even for giving an alarm.

It is intended that the patent shall cover by suitable expression in the appended claims whatever features of patentable novelty exist in the invention disclosed.

I claim as my invention:—

1. A safety device for a gas burner having a mixing chamber, comprising the combination therewith of a gas supply valve and a device having a part which is fusible at a high temperature and which is set in position to be fused by the heat consequent upon combustion occurring within the chamber, and not by heat of normal operation of the burner, and adapted on being fused to occasion the closing of said valve.

2. A safety device for a gas burner having a mixing chamber, comprising the combination therewith of a gas supply valve and a device having a part which is fusible at a high temperature and which is set in position to be fused by the heat consequent upon combustion occuring within the chamber, and not by heat of normal operation of the burner, and an electrical circuit controlling the valve; said device being arranged to control the circuit when the fusible part melts.

3. A safety device for a gas burner having a mixing chamber, comprising the combination therewith of a gas supply valve adapted to be automatically closed and a device having a part which is fusible at a high temperature and which is set in position to be fused by the heat consequent upon combustion occurring within the chamber, and not by heat of normal operation of the burner, and a normally closed electrical circuit controlling the operation of the valve; the device being adapted to break the circuit on the fusing of said part.

4. A safety device for a gas burner having a mixing chamber, comprising the combination therewith of a gas supply valve and a device having a part which is fusible at a high temperature and which is set in position to be fused by the heat consequent upon combustion occurring within the chamber, and not by heat of normal operation of the burner, and an electrical circuit controlling said valve and having parts held together by said fusible parts, adapted to move apart when said fusing occurs.

5. A safety device for a gas burner having a mixing chamber, comprising the combination therewith of a gas supply valve, means for normally holding the valve open, and a device having a part which is fusible at a high temperature and which is set in position to be fused by the heat consequent upon combustion occurring within the chamber, and not by heat of normal operation of the burner; a spring released by the fusing; and means acted upon by the spring which, upon release of the spring, allows closing of the valve.

6. A safety device for a gas burner having a mixing chamber, comprising the combination therewith of a gas supply valve and a device having a part which is fusible at a high temperature and which is set in position to be fused by the heat consequent upon combustion occurring within the chamber, and not by heat of normal operation of the burner, and an electrical circuit controlling the valve; said device having one member constituting a part of said circuit and arranged within another member constituting a part of said circuit and held therein by said fusible part and adapted to be ejected therefrom upon the fusing of said part.

7. A safety device for a gas burner having a mixing chamber, comprising the combination therewith of a gas supply valve and a device having a part which is fusible at a high temperature and which is set in position to be fused by the heat consequent upon combustion occurring within the chamber, and not by heat of normal operation of the burner, said device having one member arranged within another member, a spring also within the other member and compressed by the first member and tending to separate the two; the two being held together by said fusible part; and means whereby the separating of said two controls the closing of the valve.

8. A safety device for a gas burner having a mixing chamber comprising the combination therewith of a gas supply valve normally held open and a device having a part which is fusible at a high temperature and which is set in position to be fused by the heat consequent upon combustion occurring within the chamber, and not by heat of normal operation of the burner, said device being a plug adapted to be set in the wall of said chamber and connections adapted to permit the closing of said valve when the fusing occurs.

9. A safety device for a gas burner having a mixing chamber, comprising the combination therewith of a gas supply valve and a device having a part which is fusible at a high temperature and which is set in position to be fused by the heat consequent upon combustion occurring within the chamber, and not by heat of normal operation of the burner; said device being a tubular plug having a central and a peripheral part and connecting means forming successive parts of a normally closed electrical circuit; said circuit controlling the valve and means whereby the fusing breaks the electrical circuit between said central and peripheral parts.

10. A safety device for a gas burner having a valve and a mixing chamber, comprising the combination therewith of a thermal device actuated by a rise of temperature in the chamber beyond predetermined limits and adapted and connected to occasion the closing of the gas valve when so actuated.

11. A safety device for a gas burner having a mixing chamber, and gas shutting-off means, comprising the combination therewith of a device set in the wall of the chamber and having a part stationary at normal operating temperatures of the burner and adapted to be moved on abnormal increase of temperature in the region where it is; and connections whereby such movement occasions operation of the gas shutting off means.

Signed at Providence this thirteenth day of January, 1919.

IRA W. KNIGHT.